US007255787B2

(12) United States Patent
Bush

(10) Patent No.: US 7,255,787 B2

(45) Date of Patent: Aug. 14, 2007

(54) DEVICE AND METHOD FOR INCREASING VIABILITY IN CELL TYPES

(76) Inventor: Aaron Bush, All Care Medical Center, P.O. Box 329, Dundee, IL (US) 60118

( * ) Notice: Subject to any disclaimer, the term of this patent is extended or adjusted under 35 U.S.C. 154(b) by 301 days.

(21) Appl. No.: 10/779,354

(22) Filed: Feb. 14, 2004

(65) Prior Publication Data

US 2005/0179511 A1 Aug. 18, 2005

(51) Int. Cl.
*B01D 35/06* (2006.01)

(52) U.S. Cl. ...................................... 210/222; 210/695

(58) Field of Classification Search ................ 210/222, 210/695

See application file for complete search history.

(56) References Cited

U.S. PATENT DOCUMENTS 655,413 A 8/1900 Parkyn
3,991,714 A 11/1976 Amburn ........................ 119/1
4,181,589 A 1/1980 Frosch ........................ 204/180
4,276,139 A 6/1981 Lawson ...................... 204/180
4,988,618 A 1/1991 Li et al. ........................ 435/6
5,520,158 A 5/1996 Williamson ................. 123/538
5,542,562 A 8/1996 Oratz ......................... 220/410
5,779,892 A 7/1998 Miltenyi ..................... 210/222
5,795,470 A 8/1998 Wang et al. ................ 210/222
5,876,593 A 3/1999 Liberti ........................ 210/95
5,897,783 A 4/1999 Howe et al. ................ 210/695
6,193,892 B1 2/2001 Krueger et al. ............ 210/695
6,561,968 B1 5/2003 Dissing et al. ................ 600/13
2003/0012694 A1 1/2003 Roesicke et al. ............. 422/58

*Primary Examiner*—David A. Reifsnyder

(74) *Attorney, Agent, or Firm*—JoAnne Denison; Virginia Wallace; Denison & Assoc. PC

(57) ABSTRACT

A device for introducing a static magnetic null field is disclosed. The device is comprised of a holder for magnets, wherein the magnets are arranged so that the null field is generated in the area of a sample of cells, tissue or other cellular material. The device is configured to maintain the magnetic null field for long periods of time. The device can function with bar magnets or certain electromagnets.

14 Claims, 2 Drawing Sheets

DEVICE AND METHOD FOR INCREASING VIABILITY IN CELL TYPES

FIELD OF THE INVENTION

This invention pertains to devices for increasing cell viability in a variety of cell types in vitro and for affecting the metabolism of a variety of cell types in tissue and cell culture media. The device also has application for improving the viability of sperm used in human and breeding animal artificial insemination. The device of this invention also provides a simple mechanism for introducing and maintaining a static magnetic field relative to a sample.

BACKGROUND OF THE INVENTION

Cell motility and maintenance of cells in storage are two factors that are highly important to processes for keeping cells viable, or improving viability in cells for a variety of biologic and medical purposes. An important application for maintaining cell motility and for encouraging cell motility is the practice of artificial insemination. In vitro fertilization and artificial insemination both require a large proportion of viable motile sperm to ensure fertilization.

Cell viability must also be maximized in cell and tissue culture. Generally, in cell or tissue culture procedures the media is changed at least every 48 to 72 hours to ensure ongoing viability of the culture. This may result in disruption of the culture and minimally may cause an interruption in constant incubation temperature and other constant conditions, which may be undesirable to certain sensitive cell cultures. In certain cell and tissue cultures, cellular metabolism releases lactic acid which can build up to undesirable quantities in the media. In other circumstances, it is desirable to prevent or diminish cell growth by affecting the metabolism of a cell strain or cell type on a mixed culture. In addition, it is also often a desirable goal to be able to control the metabolic and growth rates of cells in culture. The measurement of metabolic rate of cell cultures can be made by e.g. measurement of lactic acid present in the media. Over production of the products of metabolism can alter conditions significantly within the culture. Control over the metabolic rate allows the practitioner to control the cell population. In addition, inter-cellular communication may be affected by the presence or absence of certain metabolic products.

The present invention involves the induction of static magnetic field null field which is directed to intersect with cells in media rates, to promote effects on the cell involving growth, motility, viability, inter-cellular communication and cell clumping.

In artificial insemination the general standard for viable sample is to have between about 20 to about 60 million viable sperm per cc of sample. For certain artificial insemination procedures in humans, the acceptable range for artificial insemination is between about 5 and about 20 million viable sperm per cc. This range is effective for routine use in artificial insemination. Viability is determined based upon motility.

In normally fertile males, the collection of semen is done through obtaining ejaculate, measuring the number of viable sperm and injecting the sperm into the uterus. In some instances, a split sample is obtained to maximize the number of viable sperm in the inoculate. The split sample has the longest number of viable sperm in the first portion of the ejaculate, generally. However, viability is measured solely on visual observation of members of sperm that are motile.

In decreased fertility, the first portion of the split sample of ejaculate may have 60 million viable sperm while the second ⅔ of the sample may have only 5 million viable sperm. For this reason, the first portion of the ejaculate is collected for use in normal artificial insemination or by injection of the sperm into the uterus.

In situations of decreased fertility, particularly those resulting by non-motile or clumped sperm, the application of the invention of this patent will result in awakening of dormant ions motile sperm and decreased clumping. Therefore, the effective number of viable sperm will be improved.

This device can also be applied to improve activity in sperm in a variety of breeding animals. The application of this invention for increasing the count of viable sperm is applicable to horses and to other farm animals. In certain situations, the use of the device of this invention may increase the number of viable sperm available for artificial insemination. This could vastly improve the breeding possibilities for many farm animals, and in certain instances may improve the outcome of insemination particularly in the breeding of standard bred and saddled bred horses. Restrictions of various horse breeding organizations will have to be modified prior to the universal use of the device in artificial insemination of thoroughbred horses due to the rule restrictions on artificial insemination for breeding purposes.

In particular, protocols for artificial insemination require that at least 1 million sperm per cc. inoculated during this procedure be viable. It is also desired that the sperm not form clumps as clumping reduces the ability of sperm to fertilize ova. Furthermore, in certain instances a microscopic evaluation of a sperm sample may yield a false reading of non-viability due to low evident motility. The practice of this invention, by application of the device disclosed herein, results in higher visible motility and lessened cell clumping, yielding a better result of artificial insemination.

A variety of effects have been documented pertinent to electric and magnetic fields. Several in vitro studies have been used to document responses of selected cell systems to chemical and physical agents. A substantial number of experiments have been conducted to determine the magnetic field effect on a variety of cell systems, both in vitro and in vivo systems. Magnetic field exposures of 50 to 60 Hz, delivered at strengths similar to those measured in standard residential exposure (which ranges between 0.01 to 1.0 μTesla (μT) do not produce any significant in vitro effects that are replicatable by independent studies.

Magnetic field strength greater than 500 μT (5G) have been implied to induce changes in intracellular calcium concentrations and general patterns of gene expression as well as in several components of signal transduction. The general conclusion in the scientific community is that in vitro experimentation involving magnetic field exposures between 50 to 60 Hz have been shown to induce changes in cultured cells only at field strengths that exceed average residential exposures by factors of 1,000 to 100,000.

Magnetic field effects can be induced both through the exposure to a magnetic field and by placement of a cell culture within the null area of the magnetic field. The effects of null field exposure have not been measured as widely as the effect of electric and magnetic fields to date. In particular, exposure to static magnetic fields has not been as extensively evaluated as have the effects of magnetic fields generated by power lines and appliances. These fields are generally not static (as the fields generated by magnetic are) nor are they of the strength of magnetic field as can be produced using magnetite or lodestone.

The evaluation of cellular effect of exposure to an agent can be measured via genetic effect or via mechanical effect. Cultured cells and cell populations have been used to detect the genotoxicity of different environmental agents. Those agents which cause induction of heritable genetic changes directly and those changes which are indicative of heritable changes, such as induced DNA damage, DNA repair, non-heritable chromosomal aberrations and sister chromaid exchanges have been measured. Far short, however, of genotoxic effects, are the effects of physical manipulation upon cell systems. That is, not all electromagnetic or magnetic effect will be seen in genotoxic effects. (These effects are generally transient.)

Transient changes in cell expression have been noted upon exposure of cells in vitro to electric and magnetic fields. These have been postualted as membrane mediated signal transduction by hormones and other signaling agents involving the transmission of signals across the plasma membrane. Low frequency electric or magnetic fields have been postulated to act on intra-cellular processes by influencing only the initial extra-cellular steps of signal transduction. Low frequency, low energy electric and low energy magnetic field interactions with biological systems including cells animals and humans have been conducted. Signal transduction effects have generally been seen as transient.

Although there are a great variety of signals that can be found in biologic systems, the mechanisms for transmitting the information in those signals across the plasma membrane are relatively few. Signal transduction may be a factor in cell mediated movement, cell-cell iterations and intra-cellular communications. In all known signal transduction systems, a signal interacts with an intra-cellular protein (a receptor or voltage sensitive ion channel) and triggers conformational changes in the protein that results in other signals or modifications of cellular metabolism. Signaling agents with limited ability to cross the cell membrane interact with receptor proteins that span the cell membrane. These ligand-activated receptors have an extra-cellular domain that is exposed to the medium surrounding the cell and signaling agents interact with this extra-cellular domain. Interaction of the signal with the extra cellular portion of the receptor produces conformational changes which are then transmitted across the membrane to the intra-cellular portions of the receptor molecule. Interaction of the intra-cellular portion of the receptor with other intracellular molecules causes changes in the activities of cellular pathways. The same receptor pathways may also function to affect the motility of cellular structures such as flagella and/or cilia.

Magnetic fields may interact with atoms, ions, or molecules in the plasma membrane or within the intra-cellular material or the nucleus of the cell. Any of these possible interaction methods may function in a signal transduction event leading to further changes in the function of the cell, or in the behavior of a cellular organism. Magnetic field exposures could cause changes in affinity of receptors for the ligand or in the effectiveness of transaction processes at low field strengths.

One area that has not been extensively studied is the effect of magnetic fields upon cell cultures and cell populations of induced magnetic fields exposure. The changes in response of these systems can be evaluated by comparison of the metabolism of the cells, motility of cells, and general physical condition of the cells during the evaluation. It may also be possible to show in the future that low level magnetic in electric fields may affect the ion uptake systems mediated by the plasma membrane. Alternatively, transmitters produced by various cell types may be affected by the induction of electrical or magnetic fields.

The literature remains consistent in the finding that low level electric and electro-magnetic fields have no substantiated effect, such as would cause adverse effects, cause cancer, affect reproduction or neurobehavoiral responses. Generally, studies of electro-magnetic fields have concentrated on field levels as are observable at or near high voltage transmission lines. These structures presented great concern for individuals owning property traversed by these high voltage lines in the 1970's. The general finding has been that there is little evidence of adverse effects upon animals from either power transmission line induced electric or electro-magnetic fields.

The intra-cellular structure and sub-cellular structures such as the agents of cell motion (cilia or flagella) may be affected by the signal transduction pathway of inter-cellular communications. Microtubule, centromers and other intra-cellular structures may also be effected by the application of relatively high intensity magnetic field (greater than 100 Gauss). No effect of magnetic field exposure has been found at the lower level where lower magnetic field intensities as are found near high voltage transmission lines and the like.

There are many ways to evaluate systems used to measure effects upon cells. Measurement of metabolism by lactic acid output in cell culture, cell motility, cell division, uptake of nutrient, and other various effects are used to determine the impact of an environmental gent upon a cell population.

In addition, during certain procedures for infertility treatments or during procedures for measurements of sperm viability, the exhibited motion of spermatocyes is measured to determine viability of the sample. In certain instances, non-viability may be indicated due to dormancy of cell as opposed to actual non-viability of cells. Thus, it is desirable to choose a method for inducing dormant cells to exit their dormant phase and to exhibit viability to that a true measure of sample viability can be determined.

Cells that are dormant, (thus non-motile) are often counted as non viable cells, when in fact they are not motile at the time of observation, but may become motile if environmental conditions are appropriate. The environmental conditions at issue include zinc or potassium ion concentration and amount of fructose present in the semen.

To date, there have been few processes or devices available to the practitioner to accurately determine the actual viability of cell populations where cell viability is measured by cell motility and may be affected by dormancy. The present device allows the practitioner to determine with accuracy, cell motility and/or viability.

The present invention improves cell motility without chemical addition to or modification of the media containing the cells being evaluated. In addition, the utilization of the subject invention resulted in no alteration of ultimate cell functionality and has no discernable effect upon the viability of the cells so treated.

The present invention applies directly to improved accuracy of measurement of viable flagellated cells and to improving flagellated cell viability, without any lasting adverse effect. Any improved motility may be due to effects on calcium channels in the plasma membrane. In certain cell collection procedures such as those undertaken to conduct artificial insemination, or in those measurements for determining sperm count in semen, it has been found that count of viable cells may be artificially low due to visualized inactivity of sperm cells. The within invention allows the practitioner to obtain an accurate measurement of sperm viability in a given sample by insuring that dormant sperm are not counted as non-viable. It further provides that sperm cells that are in a dormant state are not improperly attributed to a non-viable count of sperm cells but in fact are included in the count of viable sperm. Application of the within invention to cell collection media provides for accurate determination of viable cell count. This will allow medical practitioners to accurately counsel patients as to likelihood of conception in cases of previously determined low sperm count that may not result of non-viable sperm but are existent as a result of counting dormant sperm is non-viable. In addition, during artificial insemination, the within invention will allow the practitioner to perform the artificial insemination procedure using cells with a greater proportion of a sperm in the activated functional state. This result should improve the likelihood of conception as a result of the artificial insemination procedure.

The use of the device with an invention also has a demonstrated effect upon the metabolic rate of certain cell cultures. The ability to influence cell metabolic rate is important in regulation of processes where cellular metabolism runs in uncontrolled fashion, as is evident in cancer and certain infectious processes. The effect observed by applying the device of this invention is a decrease cell culture metabolism. Thereby cell culture viability and nutrient uptake may be affected. This effect may be important for sustaining cell culture populations, maintaining viable cell cultures in the laboratory.

SUMMARY OF THE INVENTION

The invention disclosed herein is a device for establishing and maintaining a static magnetic null field in a substantially fixed relationship to a quantity of cellular material. The magnetic field device is a holder having at least a first and second arm, the means for adjusting the position of the first and second arm relative to the other. The device also has attachment means for affixing a bar magnet or DC electro magnet to each of the arms of the holder device. A magnetic field is formed in the area between the two arms including a magnetic null field.

Into the magnetic null field is positioned a quantity of cellular material. The cellular material may be maintained within the magnetic field of a period of about 5 minutes to about any number of hours as desired by the practitioner. The device is suitable for use within an incubator.

The magnets used in conjunction with the magnet holder have a strength between about 300 to about 1,000 Gauss.

DETAILED DESCRIPTION OF THE PREFERRED EMBODIMENT

Figure 1:
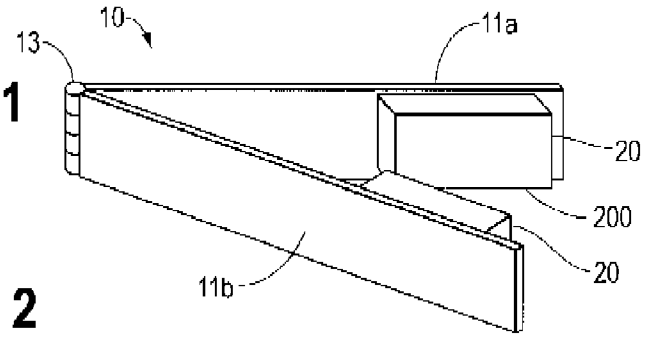
FIG. 1 is a front perspective view of one preferred embodiment of the present invention.

The within invention is a device for establishing and maintaining a static magnetic null field in a substantially fixed relationship to a quantity of cellular material contained within a magnetic field transparent substance. The cellular material maybe a collection of tissues, cells, cell cultures, tissue culture or the like. It has been found particularly appropriate for use in conjunction with evaluation of sperm motility and male fertility.

The device in one embodiment is comprised of a holder having a first arm and a second arm. To each arm is attached, in a removable or fixed position, a magnet. The magnet may be formed from magnetite or lodestone. The holder has an adjustment means, which may be a hinge or other flexible area that allows the practitioner to position the magnets in a substantially fixed arrangement relative to each other for the purpose of inducing a magnetic field between the two magnets affixed to the two arms.

The magnets can be made in the shape of a bar, and should have a magnetic strength of between about 300 Gauss to about 1,000 Gauss. It is preferred that the magnetic strength be about 500 Gauss to about 750 Gauss.

Alternatively, the sample holder may be combined with a magnetic positioning device which is comprised of a holder having a cage like appearance that determines a top opening at minimum. Into the top opening is placed in means for holding a sample holder. The sample holder should be made of a magnetic field transparent material such as glass. The holder provides means for removably attaching a magnet, which may be a bar magnet or an electro magnet formed by a DC electrical source. The magnets may be fixed to the wall of the holder. The holder must have a magnet field transparent area between the surface of each magnet that is lofted proximal to the sample container area.

The sample holder may be used in conjunction with an incubator. In these instances, the holder may be formed of a non-heat sensitive plastic or may be formed from a metal that does not affect and is not affected by the presence of the magnets.

Utilization of the within device provides the ability to maintain a cell culture sample within a magnetic field for a period of time. In addition, the magnetic field may be maintained using any holder configuration disclosed herein for any period of time.

Enhanced cell motility has been found in sperm samples exposed to the magnetic field of this device for a period as short as 10 minutes. Alteration of the metabolic function of cancer cells has been shown after exposure to the magnetic field for the period of the entire incubation of the cell cultures or for shorter periods of time.

The invention herein provides a device for introducing a static magnetic field to a sample of cellular organisms, cells in culture, tissue cultures and other cells in media. Application of the device improves detection of viable cells in media wherein viability is measured by motility. The device of this invention provides a positioning means for inducing a null field within the media containing the cells.

The device of this invention allows the standardization of induction of a static magnetic field. Magnetic fields can be generated from a variety of sources, although an electro magnetic field of the same Gauss has been found ineffective due to the alternating nature of the current including the field. A DC electro-magnet may be as effective as the nature of the current including the field. A DC electro-magnet may be as effective as the magnetic field generated with magnetite. The magnet used in the present invention are formed from magnetite, although other magnetic substances would be similarly effective at equivalent Gauss.

The position of the magnet within the disclosed device provides a null field within the sample area of the media holder. The media holder is used to position cells in media or in a carrier within the induced static magnetic null field.

It is well known for example that spermatozoa in ejaculate begin moving when the sperm encounter zinc and calcium ions in the presence of fructose within seminal fluid. Measurement of sperm viability is determined by counting the number of motile sperm in a given sample. Sperm that are not motile, but are viable, are thus counted as non-viable, as the criteria for viability is movement of the spermatozoa cell.

Exposure to a magnetic field within the range of about 500 Gauss for a predetermined period of time resulted in increased motility in the sperm sample. This effect may be a result of affecting the calcium ions or potassium ions within the intra cellular space or may be due to activation of a zinc ion controlled mechanism by enhancing zinc ion transfer into the spermatozoa. In addition, within the Examples disclosed in this detailed description, a phenomen of contact activation of one spermatozoa to another has been observed. This may also affect the ion transfer effect of calcium, potassium and zinc within the null field of the induced static magnetic field.

In the use of the disclosed of the device, it has been found that the magnetic force lines generated by the static magnets are adequate to penetrate glass. Certain plastics, provides that the magnetic force lines are established so that as they intersect at right angles, they produce a null field between the substantially parallel magnets so as to intersect with the sample area.

The invention disclosed herein provides a means for holding magnets 20 of predetermined strength enumerated in Gauss in substantial alignment with a sample (as shown alternately as 30, 33, 35, 37 in the various figures) so as to create a null field.

The device of this invention, in one embodiment shown in FIG. 1, has a first arm 11*a* and a second arm 11*b*, to which are affixed magnets 20 of measured magnetic force determined in Gauss. The preferred range for the magnets 20 is between about 450 and about 1,000 Gauss.

The arms 11*a* and 11*b* are movable by means of a hinge 13. The hinge 13 allows the practitioner to move the magnets 20 into a distal alignment relative to one another to accommodate the sample container for purposes of introducing a static magnetic field, most particularly a null field, in the sample area. The null field should be at the same vertical and horizontal positions as the sample in a container (e.g. 33) that is positioned between the magnets 20 and the opening defined by arms 11*a* and 11*b*.

Figure 2:
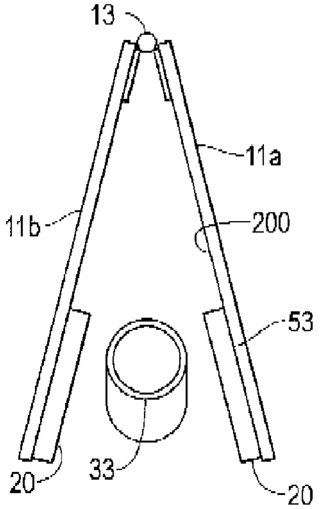
FIG. 2 is a side elevation view of the present invention shown in FIG. 1.

In FIG. 2, the sample container shown as a test tube or vial 33 which may be positioned between the magnets 20 so that the null field between the magnets 20 intersect with the vial. It is preferred that the sample vial be made from glass. The magnets should be at a vertical position approximately equivalent to the location and orientation of the sample.

Figure 3:
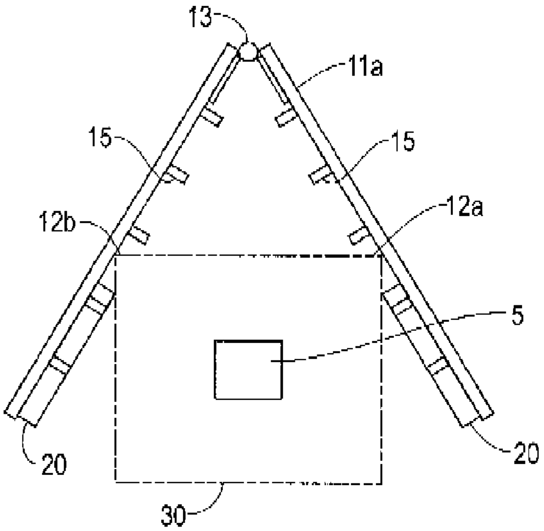
FIG. 3 is a side elevation view of an alternate preferred embodiment of the device in FIG. 1.

Turning now to FIG. 3, the sample position area is shown as 30. The magnets 20 are placed into position and hinged areas 12*a* and 12*b* are manipulated so as to align the magnets 20 in a parallel fashion with the area where the sample to be treated will be positioned. Samples may be positioned between magnets 20 and any variety of container that is appropriate to the sample 5, such as a tissue culture bottle or a test tube. Again the magnets 20 are aligned so as to produce a null field in the area defined as 30.

In the embodiment of FIG. 3, the magnets 20 are affixed to the arms of the holder 11*a* and 11*b* by means of clips at the upper and lower margins of the magnets. These clips 15 are used in the number positioned to hold the magnet against the arms 11*a* or 11*b*.

Figure 4:
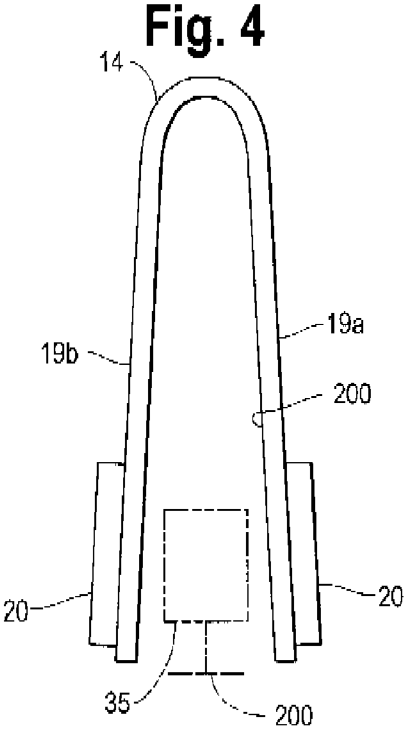
FIG. 4 is another embodiment of the device of FIG. 1 shown in side elevation.

FIG. 4 shows an alternative embodiment of the holder wherein the sample holder 35 is positioned between arms 19*a* and 19*b*. Magnets 20 are affixed to the outer portion defined by arms 19*a* and 19*b*. The means for affixing these magnets 20 to the arms 19*a* and 19*b* is a series of clips as demonstrated in FIG. 3 and is further demonstrated in FIG. 5.

In FIG. 4 the magnets are held in substantially fixed alignment by means of the set position of arms 19*a* and 19*b* relative to each other. This is accomplished by spacer 14 at the distill end relative to the sample and magnet position area. The length of arms 19*a* and 19*b* may be varied based upon the needs of the practitioner.

Figure 5:
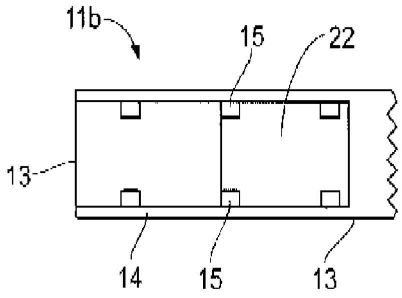
FIG. 5 is a partial view of the arm segment of the device of FIG. 1.

It is anticipated that the device as shown in FIGS. 1-4 will have arms made of a plastic that allows magnetic fields to traverse them, or that the arms will be made from a metallic substance that allows passage of the magnetic field. In the event the arms 11*a* and 11*b* and 19*a* and 19*b* are made of a megnetic opaque metal or plastic, an alternative arrangement is shown at FIG. 5. In this embodiment, the arm configuration can be made from a plastic that has clips 15 affix to it and window-like openings from passage of the field. At the distal end, or along the entire area where the magnets may be positioned, there are a series of openings that allow the magnetic field to pass through unimpeded. For this reason, the selection of plastic to be used in the device is not limited by whether or not the magnetic field will traverse the plastic. The embodiment shown in FIG. 5 has arm supporting members 13, an outer margin 14 and openings defined as 22.

Figure 6:
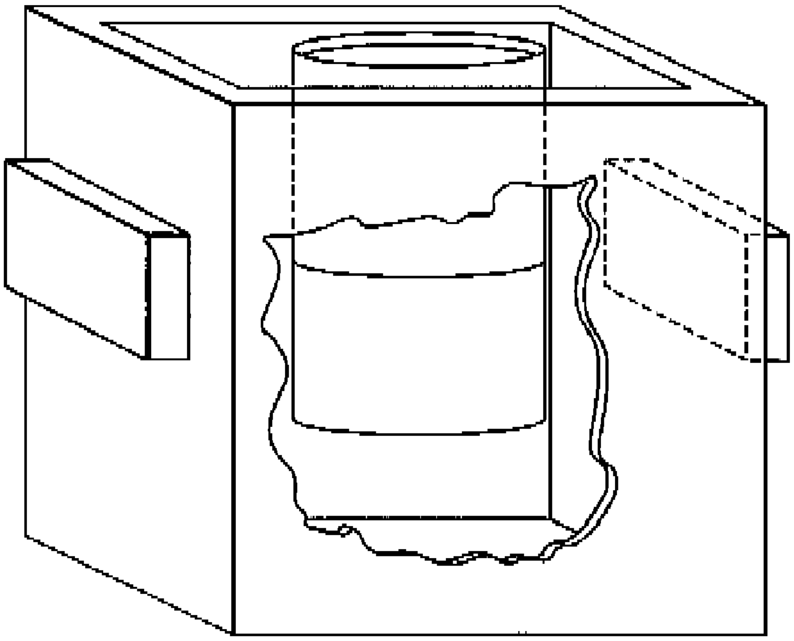
FIG. 6 is a front perspective cut away view of a preferred embodiment of the present invention.

Turning now to FIG. 6, another embodiment of the invention is shown. In this embodiment the magnets 20 are affixed to the side if a cage or boxlike embodiment shown here as 100. Within the cage 100 is a sample holder 37. The sample holder may be affixed to the walls 19 of the cage 100. This attachment may be accomplished by any means known in the art. The sample is placed within the device 100 within a sample holder 37. Sample 50 is maintained in approximately the horizontal plain, level with magnets 20. This embodiment is particularly useful for placing treated samples 50 within an incubator or similar device for long term treatment. In the alternative, the sample 50 may be maintained at room temperature wherein the sample holder 37 remains in position between the magnets 20. The size of the sample holder within 100 is determined by the strength of magnets and the resulting null field generated by the magnets 20.

EXAMPLE 1

SiHa (non-HPV-16. virus contaminating cell culture) cells were placed in T-25 Corning 25 Cm tissue cell culture flasks containing Gibco-BRL cell culture fluid. Approximately 0.25 million cells were placed into each tissue culture flask. Phenol Red was used as an indicator of metabolism. The Phenol Red marker is red when PH$\geqq$7.4 and straw colored in presence of lactic acid at PH$\leqq$7. The culture media was evaluated for viable cell population under a light microscope at 48 and 72 hours.

A split sample of the culture was exposed to the present invention. The magnetic field was set at 500 Gauss. Control flasks were subject to sham field handling by placing them within the magnet holder with the magnets.

All tissue culture flasks were maintained in an incubator at 37° C. Each sample treated with the magnetic null field was maintained in the magnetic tissue holder for the entirety of incubation. After 48 hours of incubation the cells were evaluated and photographed.

After 48 or 72 hours tissue cultures were trypsinized (Difco) and the cells were counted.

No change in metabolic rate effect was observed for the tissue cultures grown in absence of the magnetic field. Rather, those SiHa cell cultures grown in 500 Gauss magnetic null fields were observed to have a lower rate metabolism through observation of the product of metabolism i.e., lactic acid based on color change in the cell culture media. When lactic acid is produced due to cell metabolism, the pH of the culture media is reduced and the media shows a straw color. When the media remains basic, the media production that the cells exposed to a 500 Gauss magnetic field. This observation supports the finding that higher magnetic fields produce a tendency toward a still slower metabolic rate.

Tissue cultures thus evaluated showed that constant exposure to a static magnetic field affected the growth of tumor cells in culture.

EXAMPLE 2

Samples of ejaculated semen taken at least 30 minutes after collection were placed in glass container. The samples were maintained at room temperature.

A fixed magnetic field was generated by substantially parallel alignment of two 500 Gauss rod magnets for at least one 10 minute period, at periods 30, 60, 120, minutes 3, 4, 5, 6, 10, or 12 hours after collection. Each sample was exposed to the magnetic field for a 10 minute period of time.

Specimens were evaluated prior to exposure to magnetic field, during the exposure to magnetic field, and after exposure to the magnetic field to evaluate the count or number of sperm at or on motility white blood cell presence in semen and straight line motion of spermatozoa.

The following observations were made. After a single 10 minute exposure to the null field, the following characteristics were observed for each sample:

| Time after Collection | 30 Min. | 120 Min. | 4 hours | 6 hours | 8 hours |
|---|---|---|---|---|---|
| No Motility | 5 (3/5) | 8 (4/8) | 11 (5/11) | 13 (4/13) | 15 (5/15) |
| <50% Motility | 42 (37/43) | 44 (38/44) | 44 (35/44) | 61 (45/61) | 63 (41/63) |
| >50% Motility | 11 (5/11) | 48 (44/48) | 45 (42/45) | 26 (24/26) | 22 (18/22) |

Note: Numbers in parenthesis are the number of samples that showed at least a 15% improvement in motility after 10 minute exposure to magnetic field.

The device disclosed herein is but one representation of the invention. Modifications, improvement and alterations may be discerned by those skilled in the art and are fully claimed herein to the extent that they do not depart from the scope and spirit of the invention.

What is claimed is:

1. A device for establishing and maintaining a static magnetic null field in a substantially fixed relationship to a quantity of cellular material comprising:

a holder having a first arm and a second arm;

means for adjusting the relative distance between the first arm and the second arm;

attachment means for affixing a magnet to each of the arms in the holder in a manner so that a magnetic null field is formed in an area between the magnets; and wherein each of the arms has an attached magnet of predetermined magnetic strength.

2. The device of claim 1 wherein each magnet affixed to each arm has a magnetic strength of between about 300 Gauss and about 1,000 Gauss.

3. The device of claim 1 wherein each magnet affixed to each arm has a magnetic strength of about 500 Gauss.

4. The device of claim 1 wherein each magnet affixed to each arm has a magnetic strength of about 750 Gauss.

5. A device for establishing and maintaining a static magnetic null field in a substantially fixed relationship to a quantity of cellular material comprising:

at least a first arm and a second arm, the first arm and second arm being joined by a flexible hinge; each arm having flexion means located approximately medially along each arm;

attachment means for affixing a magnet to each arm; and wherein each of the arms has an attached magnet of predetermined magnetic strength.

6. The device of claim 5 wherein each magnet affixed to each arm has a magnetic strength of about 500 Gauss.

7. The device of claim 5 wherein each magnet affixed to each arm has a magnetic strength of about 750 Gauss.

8. A sample holder for maintaining a static magnetic null field in a substantially fixed relationship to a quantity of cellular material comprising:

four walls each wall having an exterior surface, the four walls defining a box with two pairs of two opposing walls and an opening sized to allow a specimen holder to fit in the box;

attachment means for affixing a magnet to the exterior surface of each of the two opposing walls of one of the pairs of two opposing walls;

each exterior surface of the two opposing walls of one of the pairs of opposing walls having affixed to it a magnet of predetermined magnetic strength; and a specimen holder capable of retaining a quantity of cellular material is fitted into the box through the opening.

9. The device of claim 8 wherein each of the four walls is formed from polyvinylchloride plastic.

10. The sample holder of claim 8 wherein each magnet affixed to each exterior surface of the two opposing walls of one of the pairs of opposing walls has a magnetic strength of between about 300 Gauss to about 1,000 Gauss.

11. The sample holder of claim 8 wherein each magnet affixed to each exterior surface of the two opposing walls of one of the pairs of opposing walls has a magnetic strength of about 500 Gauss.

12. The sample holder of claim 8 wherein said specimen holder has a capacity for holding approximately 20 cc's of liquid.

13. The sample holder of claim 8 wherein the specimen holder is formed from glass.

14. The sample holder of claim 8 wherein each magnet affixed to each exterior surface of the two opposing walls has a height; the specimen holder holds a quantity of cellular material which has a height; and the height of each magnet affixed to each exterior surface of the two opposing walls is approximately the same as the height of the quantity of cellular material in the specimen holder.

* * * * *

UNITED STATES PATENT AND TRADEMARK OFFICE

CERTIFICATE OF CORRECTION

PATENT NO. : 7,255,787 B2
APPLICATION NO. : 10/779354
DATED : August 14, 2007
INVENTOR(S) : Aaron Bush It is certified that error appears in the above-identified patent and that said Letters Patent is hereby corrected as shown below:

Column 3, Line 16: “postualted” should say -- postulated --

Column 6, Line 8: “maybe” should say -- may be --

Column 8, Line 27: “megnetic” should say -- magnetic --

Signed and Sealed this

Eighteenth Day of December, 2007

JON W. DUDAS
*Director of the United States Patent and Trademark Office*